United States Patent
Buerger

(10) Patent No.: US 11,492,764 B2
(45) Date of Patent: Nov. 8, 2022

(54) METHOD FOR CONTROLLING A TRACK CONSTRUCTION MACHINE

(71) Applicant: Track Machines Connected Gesellschaft m.b.H., Linz (AT)

(72) Inventor: Martin Buerger, Linz (AT)

(73) Assignee: TRACK MACHINES CONNECTED GESELLSCHAFT M.B.H., Linz (AT)

(*) Notice: Subject to any disclaimer, the term of this patent is extended or adjusted under 35 U.S.C. 154(b) by 513 days.

(21) Appl. No.: 16/500,013

(22) PCT Filed: Apr. 11, 2018

(86) PCT No.: PCT/EP2018/059216
§ 371 (c)(1),
(2) Date: Oct. 1, 2019

(87) PCT Pub. No.: WO2018/206214
PCT Pub. Date: Nov. 15, 2018

(65) Prior Publication Data
US 2020/0115859 A1 Apr. 16, 2020

(30) Foreign Application Priority Data
May 12, 2017 (AT) .................................. A 196/2017

(51) Int. Cl.
*E01B 33/18* (2006.01)
*B61L 23/04* (2006.01)
(Continued)

(52) U.S. Cl.
CPC ............ *E01B 33/18* (2013.01); *B61L 23/047* (2013.01); *E01B 27/17* (2013.01); *E01B 35/04* (2013.01);
(Continued)

(58) Field of Classification Search
CPC .......... E01B 33/18; E01B 27/17; E01B 35/04; E01B 35/06; E01B 2203/10;
(Continued)

(56) References Cited

U.S. PATENT DOCUMENTS

| 4,312,275 A | 1/1982 | Theurer et al. |
| 4,905,604 A | 3/1990 | Theurer |

(Continued)

FOREIGN PATENT DOCUMENTS

| AT | 516590 A1 | 6/2016 |
| CH | 644168 A5 | 7/1984 |

(Continued)

OTHER PUBLICATIONS

Chinese Office Action in Chinese Application No. 201880031036.2 dated Jan. 5, 2021 in Chinese.

(Continued)

*Primary Examiner* — Robert G Bachner
(74) *Attorney, Agent, or Firm* — Collard & Roe, P.C.

(57) ABSTRACT

The invention relates to a method of controlling a track maintenance machine, particularly a switch tamping- or universal tamping machine, which moves along a track and has working units, particularly a tamping unit and a lifting unit, which are adjustable relative to a machine frame, wherein position data of track objects, particularly sleepers, rails and optionally obstacles, are recorded by means of a sensor device in front of the working units in a working direction, and wherein operating positions of the working units are determined for a working operation at a track location. In this, prior to actuation of the working units, the determined operating positions of the working units are displayed by means of a display device, wherein, prior to carrying out the working operation, the operating positions of the working units can be changed by means of control (Continued)

elements. As a result of the display of the determined operating positions prior to the working operation, an operator is enabled to recognize possible misalignments before these become effective.

15 Claims, 7 Drawing Sheets

(51) Int. Cl.
  *E01B 27/17* (2006.01)
  *E01B 35/04* (2006.01)
  *E01B 35/06* (2006.01)
(52) U.S. Cl.
  CPC .......... *E01B 35/06* (2013.01); *E01B 2203/10* (2013.01); *E01B 2203/122* (2013.01); *E01B 2203/125* (2013.01); *E01B 2203/16* (2013.01)
(58) Field of Classification Search
  CPC ......... E01B 2203/122; E01B 2203/125; E01B 2203/16; B61L 23/047
  See application file for complete search history.

(56) References Cited

U.S. PATENT DOCUMENTS

| | | | |
|---|---|---|---|
| 4,986,189 A * | 1/1991 | Theurer | ................. E01B 27/17 104/12 |
| 5,090,329 A | 2/1992 | Theuer | |
| 5,113,767 A | 5/1992 | Theurer | |
| 6,058,628 A | 5/2000 | Theurer et al. | |
| 6,260,485 B1 | 7/2001 | Theurer et al. | |
| 9,592,842 B1 | 3/2017 | Mercer | |
| 2017/0328013 A1* | 11/2017 | Lichtberger | ............ E01B 35/06 |
| 2019/0136462 A1 | 5/2019 | Buerger et al. | |

FOREIGN PATENT DOCUMENTS

| | | | |
|---|---|---|---|
| CN | 1042960 A | 6/1990 |
| CN | 1051220 A | 5/1991 |
| CN | 1054461 A | 9/1991 |
| CN | 1216792 A | 5/1999 |
| CN | 1263184 A | 8/2000 |
| CN | 101899803 A | 12/2010 |
| DE | 3923733 A1 | 8/1990 |
| EP | 1418273 A1 | 5/2004 |
| GB | 2043138 A | 10/1980 |
| WO | 2017/215777 A2 | 12/2017 |
| WO | 2017215777 A2 | 12/2017 |

OTHER PUBLICATIONS

International Search Report of PCT/EP2018/059216, dated Jun. 8, 2018.

Chinese Office Action in Chinese Application No. 201880031036.2, dated Jan. 5, 2021 with English translation.

* cited by examiner

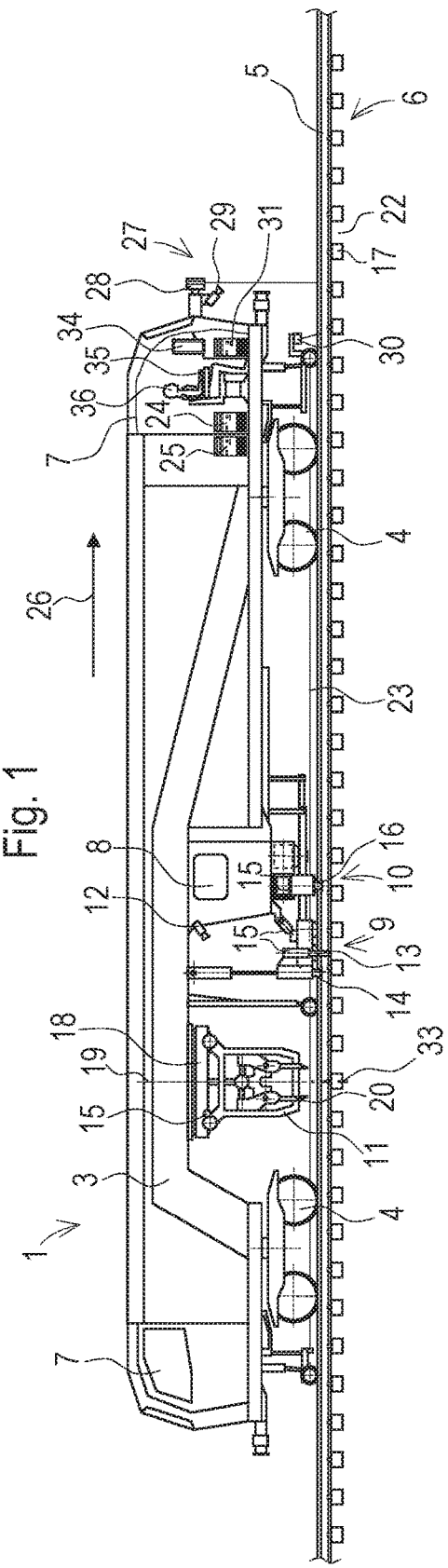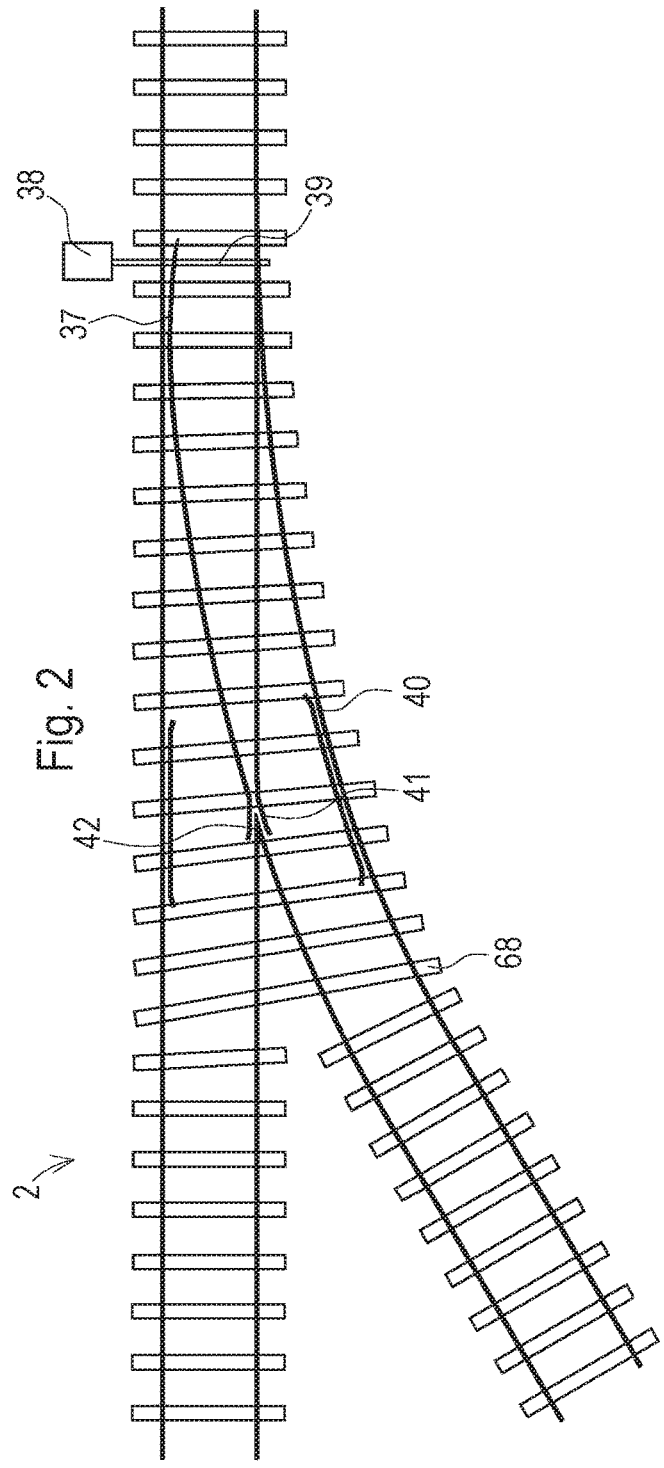

METHOD FOR CONTROLLING A TRACK CONSTRUCTION MACHINE

CROSS REFERENCE TO RELATED APPLICATIONS

This application is the National Stage of PCT/EP2018/059216 filed on Apr. 11, 2018, which claims priority under 35 U.S.C. § 119 of Austrian Application No. A 196/2017 filed on May 12, 2017, the disclosure of which is incorporated by reference.

FIELD OF TECHNOLOGY

The invention relates to a method of controlling a track maintenance machine, particularly a switch tamping- or universal tamping machine, which moves along a track in a continuous or cyclic manner and has working units, particularly a tamping unit and a lifting unit, which are adjustable relative to a machine frame, wherein position data of track objects, particularly sleepers, rails and optionally obstacles, are recorded by means of a sensor device in front of the working units in a working direction, and wherein operating positions of the working units are determined for a working operation at a track location. Additionally, the invention relates to a correspondingly configured track maintenance machine.

PRIOR ART

According to DE 39 23 733 A1, a track maintenance machine having a sensor- and control system is known. Here, sleepers, sleeper cribs, rails and obstacles in the track are first recorded at a track location by means of a sensor device and stored. In dependence of the recorded track objects, operating positions for working units of the track maintenance machine are determined in order to avoid a collision with an obstacle, for example. As soon as a working unit, for instance a tamping unit, arrives at the track position during a working advance, the working unit drives are activated in an automatized way in order to bring the working unit into the determined operating position. This sequence repeats cyclically for further track positions at which a corresponding working operation is to be performed.

A corresponding solution for a switch tamping machine is disclosed in AT 516 590 A1. On the basis of measurement values of a switch component measuring installation, operating positions of a lifting-lining device are determined, wherein a closing path of roller tongs and an adjustment path of a lifting hook are queried continuously in order to ensure that pre-determined positions have been stopped at, or that a rail has been securely gripped.

SUMMARY OF THE INVENTION

It is the object of the invention to indicate an improvement over the prior art for a method and a track maintenance machine of the type mentioned at the beginning.

According to the invention, these objects are achieved by way of the features of claims 1 and 12. Dependent claims indicate advantageous embodiments of the invention.

In this, it is provided that prior to actuation of the working units, the determined operating positions of the working units are displayed by means of a display device and that, prior to carrying out the working operation, the operating positions of the working units can be changed by means of control elements. In this manner, a simple check of the determined operating positions is possible without curtailing the advantages of an automatized control of the working unit.

As a result of the display of the determined operating positions prior to a working operation, an operator is enabled to recognize possible misalignments before these can become effective. Such exceptional situations can occur, for example, if obstacles get to the track location intended for the working operation only after the sensor device has passed.

An adjustment of the operating positions then takes place in a simple manner by means of control elements, so that the work progress is not impeded. During this, particularly those control elements can be employed which have also been used heretofore for manual control in non-automatized working units.

In an advantageous embodiment of the invention, a virtual representation of the track is shown in the display device, wherein also the determined operating positions of the working units are displayed with respect to said representation. In this way, an operator has an immediate impression of which situation can be expected with the determined operating positions at the track location to be treated.

A further improvement exists if a photographic representation of the track is displayed in the display device. This enables an intuitive grasp of the given work situation at the track location to be treated, whereby a quick reaction is promoted with otherwise little stress for an operator.

In a further development, the checking of the determined operating positions is also facilitated in that the sleepers, the rails and, optionally, identified obstacles are classified as distinguishable objects in the display device and marked accordingly (for example, by different colours). A classifying method for track objects is disclosed in the Austrian patent application A 287/2016 of the applicant. This disclosure is hereby incorporated in the present application, particularly paragraphs 35 and 55 to 65.

For an efficient representation by means of the display device, it is useful if a display horizon moving along with the track maintenance machine is specified which is located ahead of a current position of the working units in the working direction, and if the determined operating positions of the working units are displayed until the display horizon has been reached. The display of the determined operating positions then takes place at a temporal distance to the actual activation of the working units, so that sufficient time remains for readjustments.

In this, it is favourable if, until the display horizon is reached, a query for confirmation of the determined operating positions of the working units is displayed and if, particularly in the event of reaching the display horizon without confirmation of the query, the track maintenance machine is stopped. In this way, an operator has the possibility to confirm displayed operating positions without having to intervene in the subsequent process. As an advantageous safety measure, the machine is stopped if the operator shows no reaction.

Advantageously, in the event of approval of the determined operating positions and when the track location is approached, the working units are brought into the operating positions by means of automatically actuated drives, wherein subsequently the working operation (for example, track lifting by means of lifting unit and tamping of a sleeper by means of tamping unit) is carried out.

In the event of rejection of the determined operating position of a working unit, it is advantageous if, upon reaching the track location, the working unit is stopped, and if the working unit is brought into the operating position by means of drives actuated via the control elements. A manual positioning of this kind represents a routine procedure for an operator of a track maintenance machine, so that quick execution is ensured. Optionally, an automatized positioning takes place parallel thereto at working units not concerned, for which confirmation already exists.

In another embodiment of the invention, instead of a confirmation query it is intended that, when approaching the track location, the working units are brought into the determined operating positions by means of automatically controlled drives, that the operating positions can be readjusted via the control elements, and that the working operation is carried out after actuation of a release control element. Since, in the normal case, no readjustments are required, the task of an operator is reduced to cyclically releasing the automatically controlled operating positions.

In the method of controlling a track tamping machine, it is advantageous if the determined operating position of a lifting hook of the lifting unit is displayed together with information about a detected gripping position at a rail base or at a rail head. With a display representation of this kind, the specified lifting arrangement at the track location can be assessed quickly and unequivocally.

In addition, it is advantageous for a method of controlling a switch tamping- or universal tamping machine if the determined operating position of an extendable auxiliary lifting unit is displayed with information about an extension- or retraction procedure. In this way, an employment of the auxiliary lifting unit can be checked prior to an actual activation. Specifically, a trouble-free extending and retracting can be ensured. Advantageously, a setting angle of a rail gripping device located at the free end of the auxiliary lifting unit as well as a determined operating range of the auxiliary lifting unit are also displayed.

A track maintenance machine according to the invention comprises a machine frame relative to which adjustable working units are arranged, and a sensor- and control system for automatized actuation of the working units, wherein the sensor- and control system comprises a display device and control elements and is configured for carrying out one of the afore-mentioned methods. In the case of a continuously working track tamping machine, the machine frame and the working units are arranged in a so-called satellite which is moved cyclically back and forth relative to a vehicle frame.

In this, it is advantageous if the sensor- and control system comprises a sensor device having several differently constructed sensors. With this, different structures and elements of the track can be recorded, wherein a fusion of the sensor data results in a detailed overall picture of the track. This overall view serves as basis for a particularly precise determination of the operating positions of the working units.

An advantageous embodiment of the sensor- and control system comprises a so-called guiding computer for correction of a track position, a machine control for actuation of the working units and a computer unit for determining the operating positions of the working units, wherein the guiding computer, the machine control and the computer unit are connected via a bus system. Thus it is possible to retrofit existing track maintenance machines.

A further simplification of the track maintenance machine exists if the display device and the control elements are arranged in a driver's cabin, and if a camera for transmission of real-time images of the working units into the driver's cabin is arranged for an adjustment of the working units by means of the control elements. Since, as a rule, the automatized working process does not require any readjustment, heretofore necessary work cabins with a view of the working units can be omitted. With this, a significant reduction of the weight and the dimensions relative to conventional track maintenance machines is achieved.

BRIEF DESCRIPTION OF THE DRAWINGS

The invention will be described by way of example below with reference to the attached figures. There is shown in schematic representation in:

FIG. 1 track maintenance machine
FIG. 2 switch
FIG. 3 layout of a switch to be tamped
FIG. 4 sensor- and control system
FIG. 5 method sequence with confirmation query
FIG. 6 alternative method sequence
FIG. 7 representation of the lifting units in the display device
FIG. 8 combined representation in the display device
FIG. 9 representation of the tamping units in the display device

DESCRIPTION OF THE EMBODIMENTS

Figure 3:
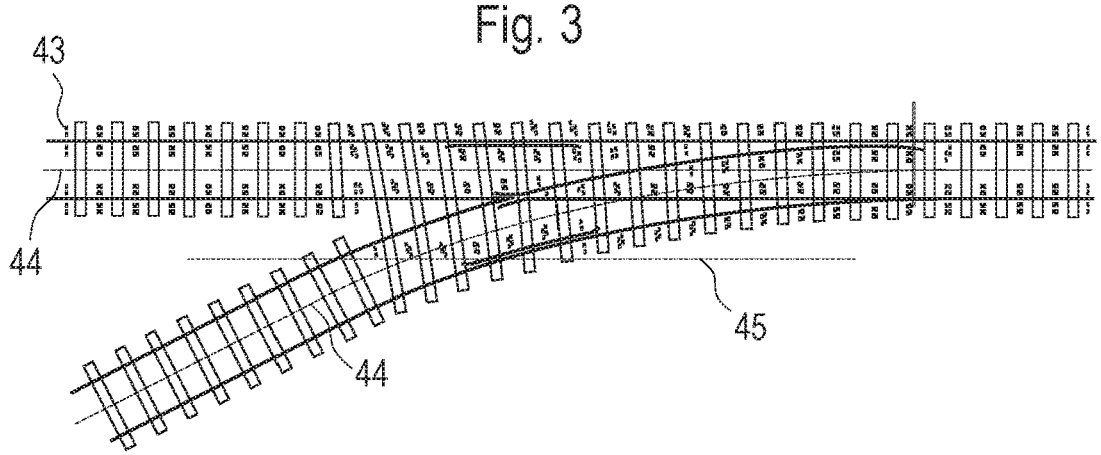

The track maintenance machine 1 shown in FIG. 1 is a switch tamping machine for tamping a switch 2. The machine 1 comprises a machine frame 3 which, supported on undercarriages 4, is mobile on rails 5 of a track 6. Alternatively to the example shown, in a continuously working track tamping machine a vehicle frame is supported on the undercarriages 4 and a satellite comprises the machine frame 3. Arranged at the two front sides in each case is a driver's cabin 7. In a simple variant of the present invention, there is additionally provided a work cabin 8 with direct view of working units 9, 10, 11 which are adjustable relative to the machine frame 3. This work cabin 8 can be omitted if cameras 12 are arranged which transmit real-time images of the working units 9, 10, 11 into the driver's cabin 7.

As working units 9, 10, 11, the exemplary switch tamping machine comprises a lifting unit 9 which is usually designed as a combined lifting- and lining unit. Such a working unit 9 has a lifting hook 13, at least one lining roller, and roller lifting tongs 14 for each rail 5 of the track 6. The lifting hook 13 in each case is vertically adjustable and engages selectively under the rail head or the rail base. By means of several drives 15, the lifting unit 9 is adjustable relative to the machine frame 3. The track 6 is lifted to a desired level by means of lifting cylinders. Additionally, there is lateral adjustability for lining the track and longitudinal adjustability for adjustment of the gripping members 13, 14 in the longitudinal direction.

An auxiliary lifting unit 10 for gripping a branch rail 5 is arranged for uniform lifting of the switch 2. This working unit 10 has a telescopically extensible carrier. The extended carrier is pivotable upward about a longitudinal axis of the vehicle by means of a drive 15. At the free end of the carrier, an adjustable rail gripping device 16 (head) is arranged.

Adjustable tamping units 11 are arranged on the machine frame 3 for tamping a sleeper 17. Specifically, the tamping units 11 are fastened on a suspension device 18 (turntable). For adaptation to sleepers 17 positioned obliquely, the suspension device 18 is mounted on the machine frame 3 for rotation about a vertical axis 19. Additionally, the tamping units 11 are laterally displaceable together and separately via drives 15. Each tamping unit 11 usually has two pairs of oppositely positioned tamping tines 20 which, actuated with vibration, are lowered into sleeper cribs 22 during a working operation 21 and squeezed together by means of squeezing cylinders. For tamping double sleepers, so-called limit flaps at the squeezing cylinders are folded back by means of drives 15 in order to increase the opening width of the oppositely positioned tamping tines. For further adaptation to the geometry of the switch 2, the individual tamping tines 20 are separately pivotable about a longitudinal axis of the machine.

During the working-through of a switch, the track geometry is continuously measured by means of a chord measuring system 23. During this, a so-called guiding computer 24 prescribes target values determined beforehand. The guiding computer 24 is coupled to a machine control 25. This machine control 25 activates the lifting- and lining drives of the lifting units 9, 10 in order to match the track geometry to the target values.

A sensor device 27 is arranged at a front face side of the track maintenance machine 1, as viewed in a working direction 26. This sensor device 27 comprises, for example, a laser rotation scanner 28, a colour camera 29 and several laser line scanners 30. During forward travel, the laser rotation scanner 28 delivers a three-dimensional point cloud of the track 6 including the surroundings. The laser line scanners 30 are directed towards the rail webs in order to cover shaded areas. By means of the colour camera 29, photographic images of the track 6 are continuously recorded.

The data recorded by means of the sensor device 27 are processed in a computer unit 31 and stored in a suitable storage unit 32 (for example, a computer with hard disk). First, a three-dimensional model of the track 6 including surroundings is computed from the point cloud and the colour images. By means of object recognition, disclosed in Austrian patent application A 287/2016, sleepers 17, sleeper cribs 22, rails 5 and obstacles 37-42 are identified in the model. In further sequence, the usability of the working units 9, 10, 11 is checked for each track location 33 at which a working operation 21 is to be carried out. For example, sleeper cribs 22 accessible to the tamping units 11 are determined. For the lifting units 9, 10, the best possible gripping positions are determined. In this way, pre-determined operating positions of the working units 9, 10, 11 are found for each working operation 21.

Arranged in the driver's cabin 7 or in the work cabin 8 is a display device 34 (monitor, touch screen, etc.) on which the determined operating positions are shown before an actual activation of the working units 9, 10, 11 takes place. Additionally, control elements 35 are arranged in the corresponding cabin 7, 8. By means of the same, an operator 36 can change the operating positions of the working units 9, 10, 11 prior to executing the working operation 21.

FIG. 2 shows a switch 2 in a top view. Here, the usual switch components are considered as obstacles for the working units 9, 10, 11. These are, for example, blades 37, actuator 38, switch linkages 39, check rails 40, wing rails 41 and frog 42. The position and extent of these obstacles 37-42 are detected by means of the sensor device 27.

For each switch or type of switch, there usually exist tamping layouts as shown in FIG. 3. In these, tamping positions 43, planned for the required working passes, for the individual tamping units 11 or tamping tines 20 are drawn in. In the example shown, these are the planned tamping positions 43 for a first working pass during which the switch tamping machine moves along the continuous rail of the switch 2. In a second working pass, the branch rail is travelled on, wherein those regions are treated which were not tamped during the first working pass. The respective track center serves as machine guiding line 44, and a maximum swing-out width 45 for the outer tamping unit 11 in each case is indicated.

Figure 4:
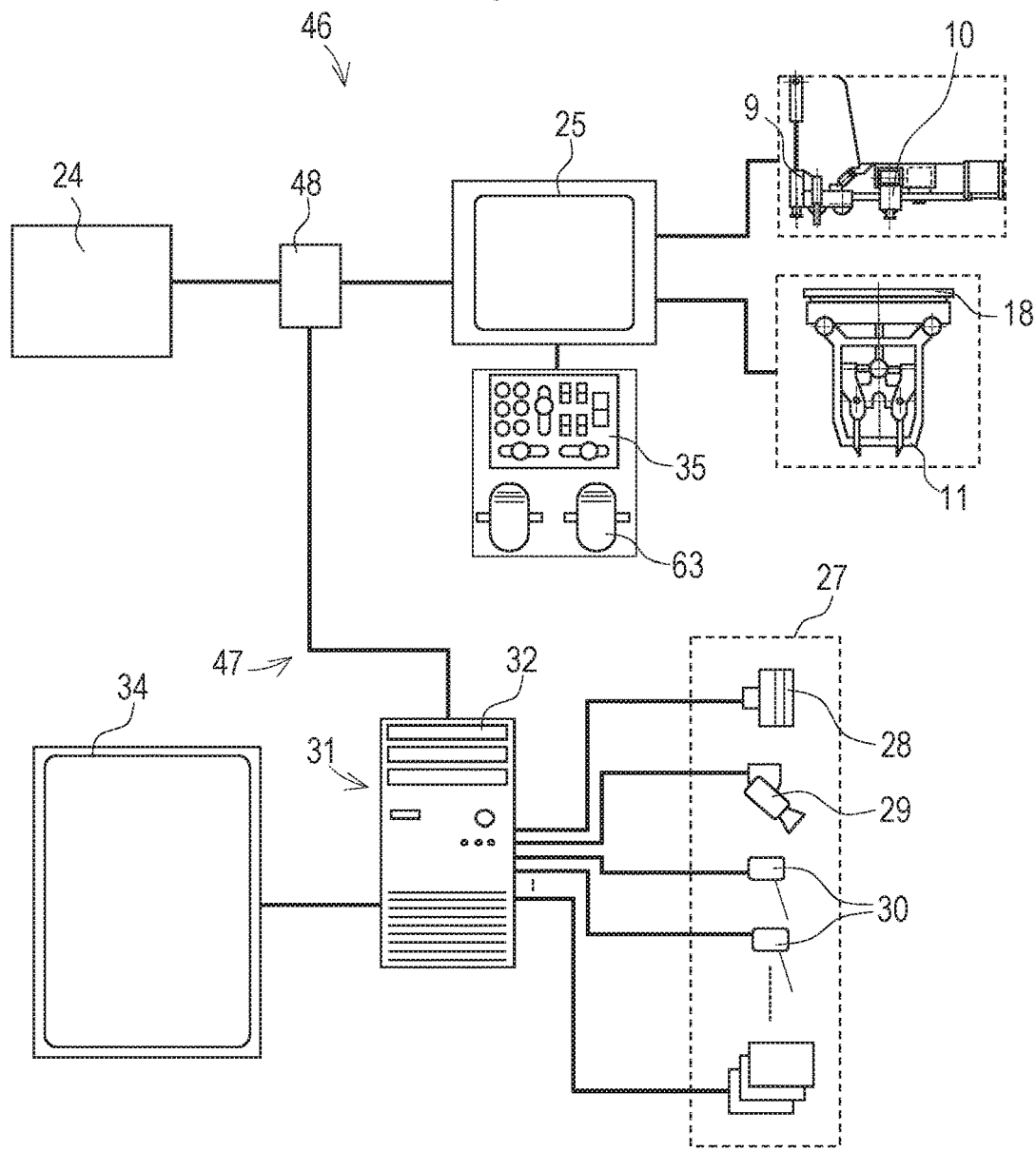

A sensor- and control system 46 arranged in the track maintenance machine 1 comprises the guiding computer 24, the machine control 25, a bus system 47, the computer unit 31 and the sensor device 27 (FIG. 4). The individual sensors 28, 29, 30 are connected to the computer unit 31. Depending on the application, additional sensors (for example, an induction sensor) may be added to the sensor device 27.

In the computer unit 31, the sensor data are joined together into a model of the track 2 and evaluated. The results of this evaluation are the individual operating positions of the working units 9, 10, 11 for the track locations 33 to be treated. For calculating the operating positions at the track location 33 to be treated in each case, geometric data of the track maintenance machine 1, particularly of the working units 9, 10, 11, are stored in the computer unit 31.

By means of the geometric data of the track maintenance machine 1, the computer unit 31 determines from the position- and geometric data of the track 6 and the track objects 5, 17, 22, 37-42 and from the derived digital track model the optimal operating positions of the working units 9, 10, 11 and of the assembly components at the track location 33 to be treated. Parallel to that, the current position of the track maintenance machine 1 or the working units 9, 10, 11 relative to the track 6 is continuously recorded by means of the sensor device 27 or by means of further sensors (for example, transducers). Via a continuous comparison of these data in the machine control 25, an allocation of the corresponding operating positions of the working units 9, 10, 11 takes place upon reaching the track location 33.

Optionally, the tamping layouts with the planned tamping positions 43 or neuralgic points of a switch 2 derived therefrom can be stored in the computer unit 31. Such plan data indicate, for instance, where a change of guiding lines (rail 5) is to take place for an individual tamping unit 11. For a main line tamping, for example, it is prescribed that tamping is to take place with the outermost unit 11 along the branching-off rail until the maximum swing-out width 45 has been reached. Then there is a lateral displacement to the inner rail of the branching-off track, and the same is pursued further until again the maximum swing-out width 45 has been reached. At this point, a return of the unit 11 to the main line is scheduled. By means of the display device 34 connected to the computer unit 31, the determined operating positions are indicated to the operator 38.

The bus system 47 is designed as an Ethernet, for example. Via an Ethernet switch 48, the data of the computer unit 31 and of the guiding computer 24 are fed to the machine control 25. This network structure provides the possibility to expand existing track maintenance machines 1 with the present assistance system for automatized control of the working units 9, 10, 11.

Control elements of the machine control 25 can be used as control elements 35 for adjusting the operating positions. Alternatively, control elements connected to the computer unit 31, wireless control elements or touch screens can be used. The machine control 25, usually designed as a storage-programmable control (SPS), actuates the individual drives 15 of the working units 9, 10, 11. Favourably, the working units 9, 10, 11 are equipped with sensors for recording the current unit positions. Such a feedback optimizes the actuating procedures. Optionally, deviations of the actual operating positions, calculated by means of the sensors, from the determined desired operating positions are recorded in a tamping protocol.

Figure 5:
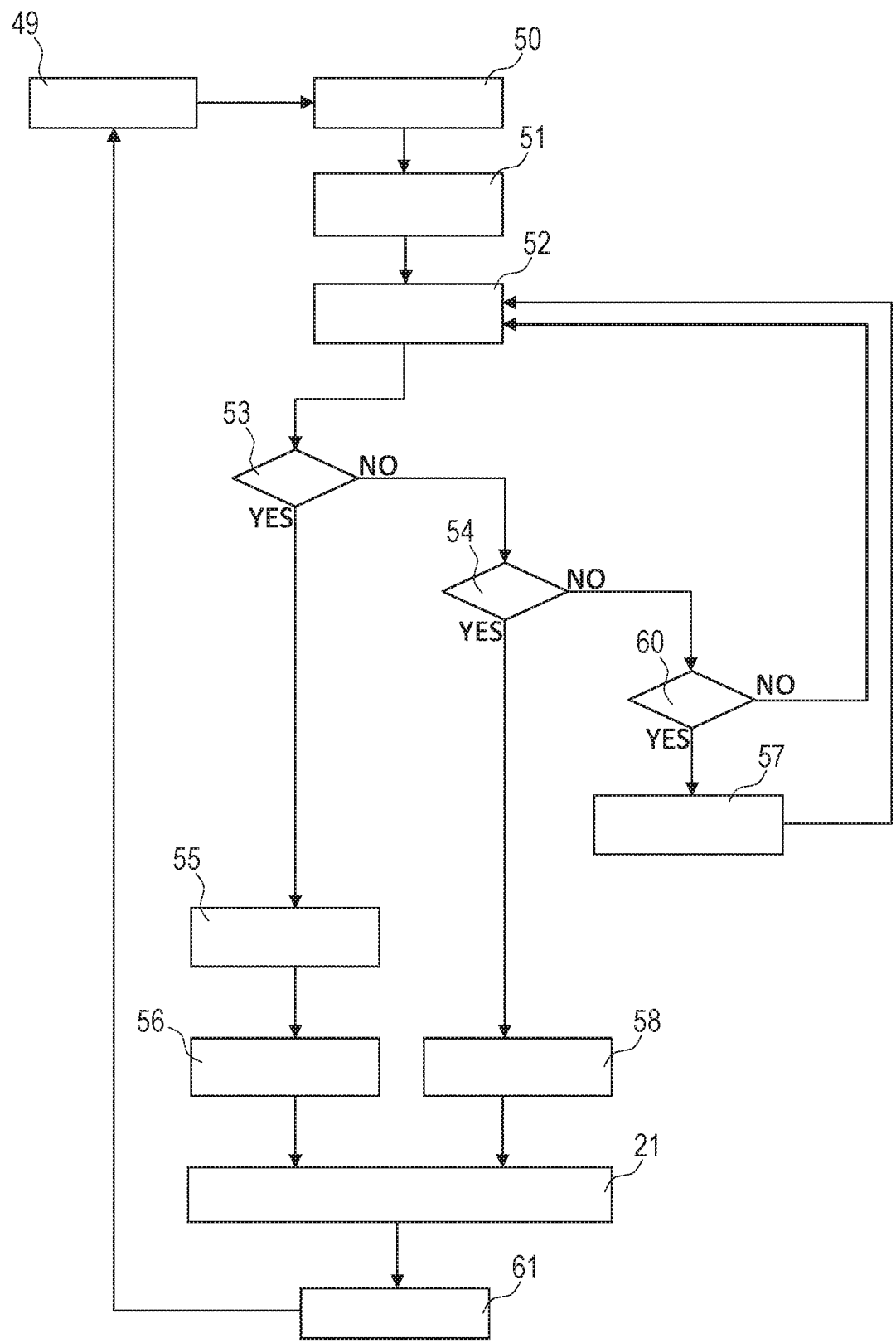

An advantageous method sequence is shown in FIG. 5. The same is carried out, for example, in a first operating mode of the track maintenance machine 1. Starting from an object- and position determination 49, a model formation 50 of the track 2 takes place by means of known numerical methods. In the next method step, the operating position determinations 51 for the working units 9, 10, 11 take place, referenced in each case to a track location 33 to be treated. The operating positions are shown in a display procedure 52 on the display device 34, linked to a confirmation query. This confirmation query is composed of an approval query 53 and a rejection query 54.

In case of a confirmation YES of the approval query 53, a data transmission 55 to the machine control 25 takes place in order to transform the determined operating positions into control signals for the working units 9, 10, 11. With this, an automatized positioning 56 of the working units 9, 10, 11 is carried out upon reaching the corresponding track location 33, and in the next step the working operation 21 (lifting- or lining procedure and tamping procedure) is executed.

In case of a confirmation YES of the rejection query 54, the working units 9, 10, 11 are stopped as soon as they have arrived at the corresponding track location 33. A manual positioning 58 of the working units 9, 10, 11 by means of the control elements 35 follows. In the case of a continuously working track tamping machine, at first only the satellite is stopped. A stopping of the entire vehicle takes place only when the same comes up against the satellite (in most cases, the manual positioning 58 is finished beforehand). Tamping units 11 are positioned above the sleeper 17 currently to be tamped. The positioning 58 of the roller lifting tongs 14 takes place prior to moving on to the next sleeper 17. After execution of the working operation 21 and the onward travel 61, a next working cycle follows.

If there are several working units 9, 10, 11, an inconsistent confirmation is also possible. In this, only a part of the determined operating positions is approved, with a subsequent automatized positioning 56. In the other part with rejected operating positions, the corresponding working unit 9, 10, 11 is stopped at the track location 33 intended for the working operation 21 and positioned manually.

As confirmation deadline for the queries 53, 54, a display horizon 59 moved along with the track maintenance machine 1 is displayed. In case of a display horizon attainment 60 without query confirmation, a stop 57 of the machine 1 is triggered. The track maintenance machine 1 stops until either an approval or a rejection of the indicated operating positions takes place. With this safety measure, onward travel is blocked if the operator 36 does not carry out a confirmation.

For further safeguarding, in a second operating mode, a release query 62 can take place immediately prior to the working operation 21. As release action, the operator activates a release control element 63 (for example, a pedal). This procedure can take place without interruption of the process, so that, as a rule, there are no delays as a result of this safety measure.

Figure 6:
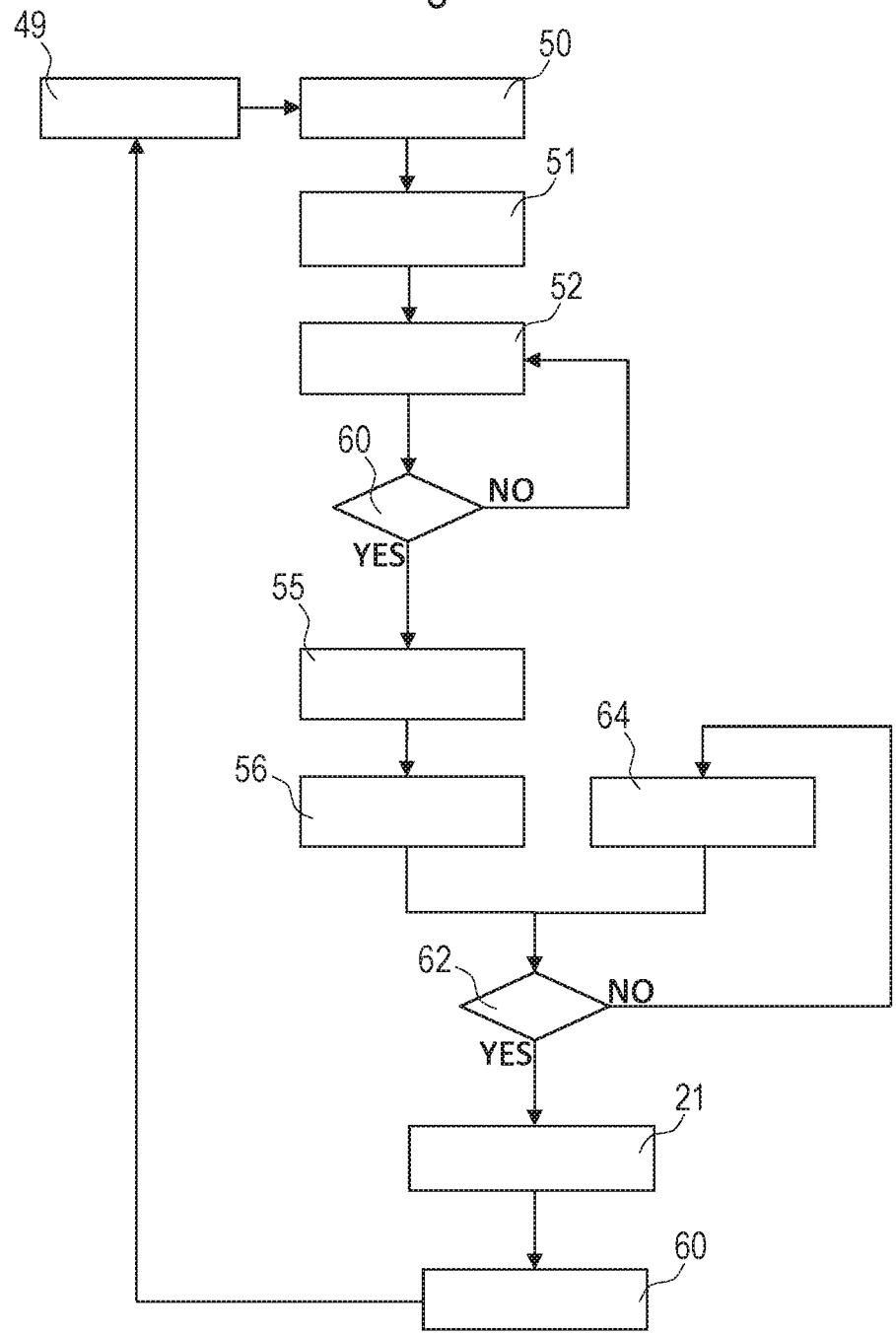

An alternative method sequence is shown in FIG. 6. Here, in a third operating mode, the determined operating positions are displayed without confirmation query up to the display horizon attainment 60. Then the data transmission 55 to the machine control 25 and the automatic positioning 56 of the working units 9, 10, 11 takes place. For carrying out the working operation 21, a release query 62 must be confirmed (YES). To that end, the operator 36 actuates a release control element 63. Prior to that, however, there is the possibility of readjustment 64 of the operating positions by means of control elements 35.

Figure 7:
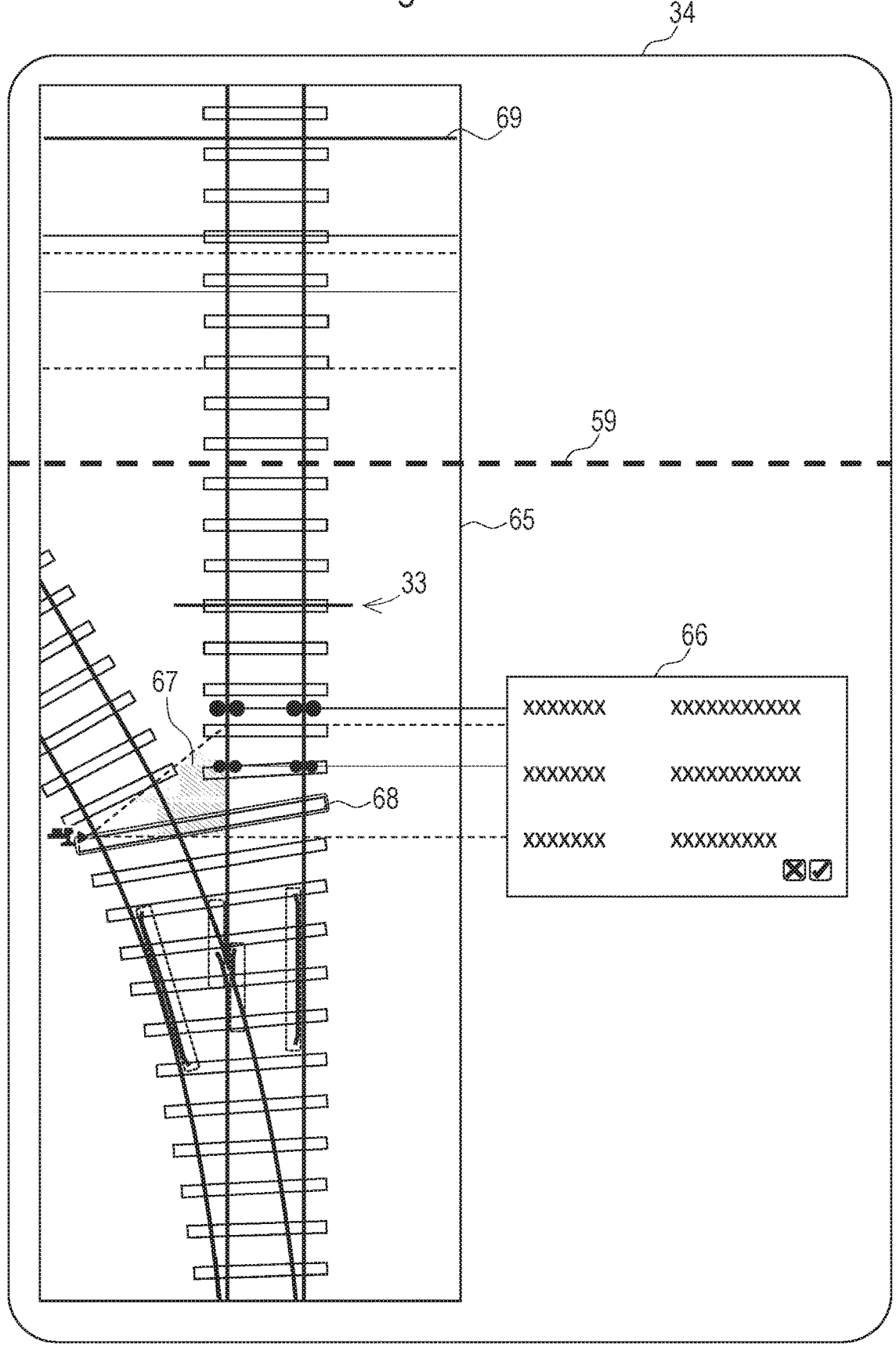
Figure 8:
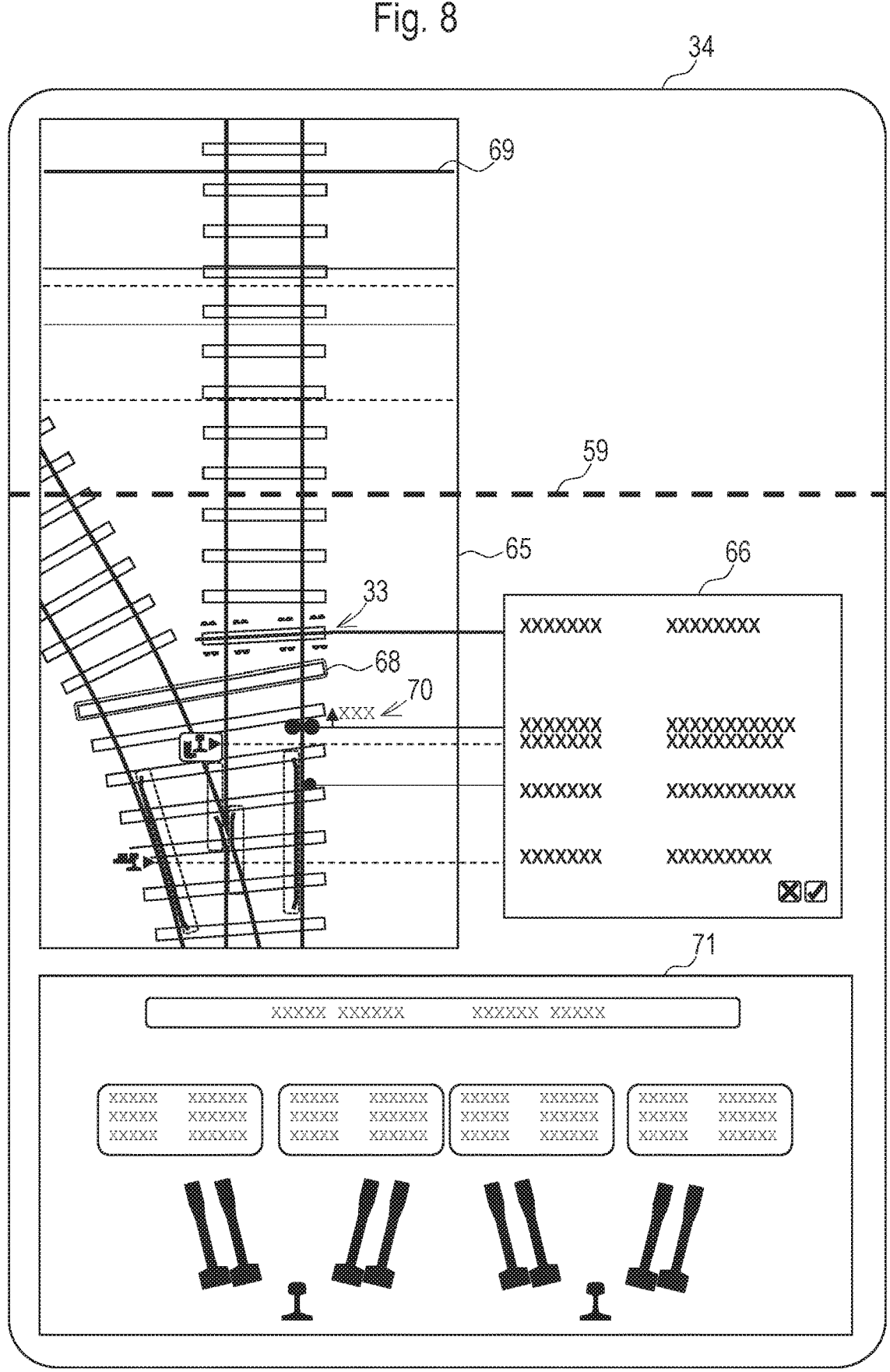
Figure 9:
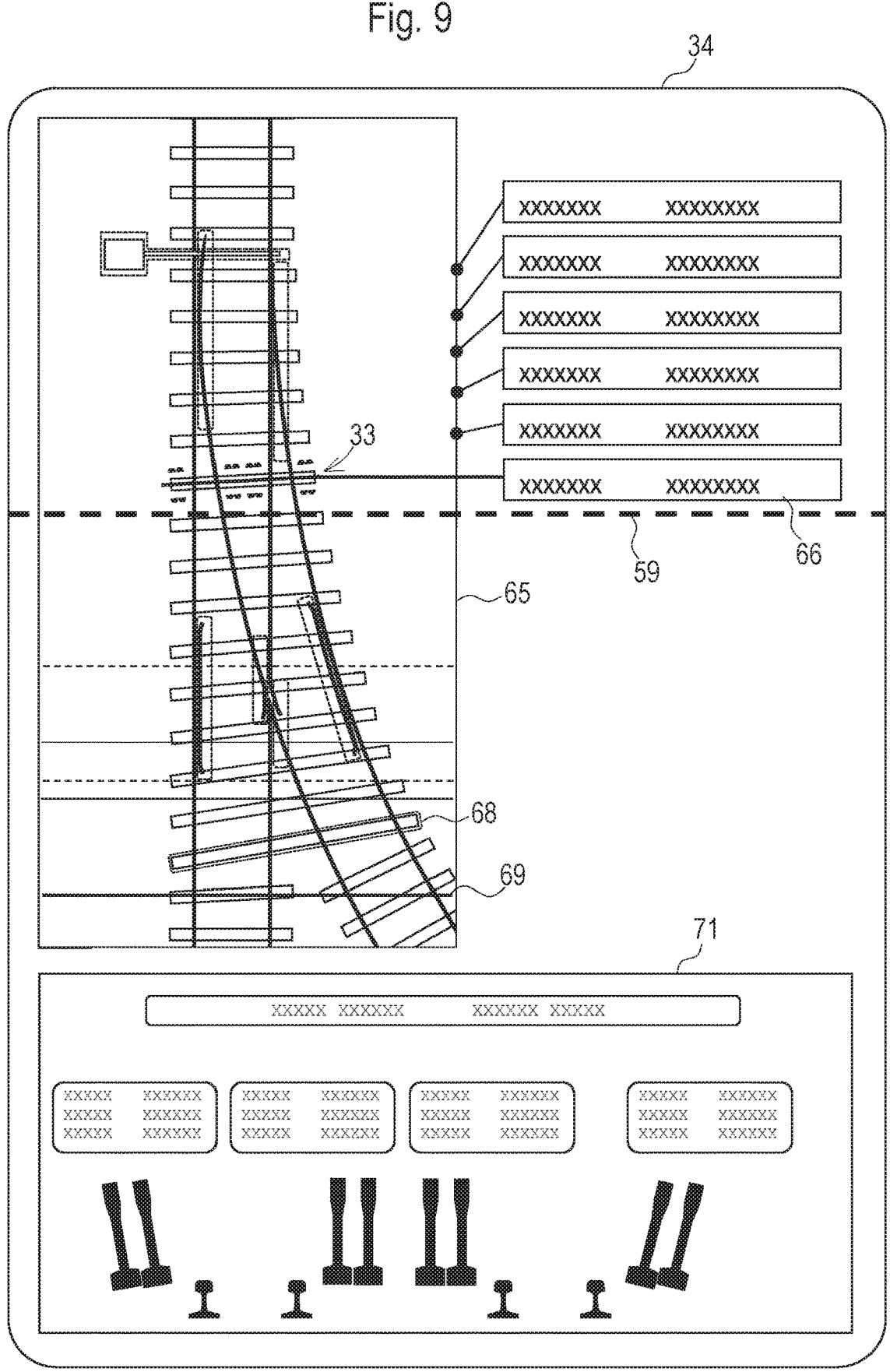

FIGS. 7-9 show exemplary representations which are displayed to the operator 36 by means of the display device 34. The display is subdivided into a first display window 65 with an image of the switch 2 and a second display window 66 with data regarding determined operating positions. The display horizon 59 is shown as a dashed line. The display horizon 59 and the first display window 65 move along with the track maintenance machine 1, so that during onward travel 61 the image of the switch 2 moves in the first display window counter to the working direction 26.

In FIG. 7, the operating positions of the lifting unit 9 and of the auxiliary lifting unit 10 at a track location 33 to be treated are inserted. During tamping, this is the track location 33 at which the tamping units 11 are be positioned. In front thereof in the working direction 26 are the lifting devices 9, 10. In the example shown, the use of four roller lifting tongs 14 of the lifting unit 10 as well as the rail gripping device 16 of the auxiliary lifting unit 10 was determined for the track location 33. In this, the respective operating position is shown as a circular disk (gripping device in use) or as a pictogram (gripping device). A cross-hatched triangular surface shows an extension procedure 67. The corresponding surface on the track 6 must be free of obstacles jutting up (for example, a signal lantern).

Usefully, a setting angle of the rail gripping device 16 (adjustable head at the free end of the auxiliary lifting unit 10) is also shown. At this setting angle, a guiding roller is oriented parallel to the branching-off rail 5.

Additionally, the first long sleeper 68 of the switch 2 is highlighted. Also, all recognized obstacles 37-42 are marked either in colour or by framing. Complementarily, a superimposing of the contours of the individual track objects 5, 17, 22, 37-42 with a photographic representation of the track 6 is useful to present the operator 26 with a comprehensive total view of the situation. In this manner, optionally not recognized obstacles or insufficient operating positions are immediately recognizable.

In the second display window 66, further information to the determined operating positions of a lifting activity is displayed. Useful information, for example, is the number of gripping members 13, 14, 16 in operation and, derived therefrom, a quality statement whether a safe track lifting can be expected. In addition, a track path covered (kilometre mileage) can be indicated for each gripping member 13, 14, 16. To that end, a separate line is associated with each gripping member 13, 14 16. With this assignation, by colour or otherwise, the current positions of the working units 9, 10, 11 are also inserted in the first display window 65. These are located behind the display horizon 59 in the working direction 26. For example, a solid line 69 marks the current position of the tamping unit 11.

FIG. 8 shows a combined representation of the operating positions of all working units 9, 10, 11. For the lifting unit 9, a longitudinal displacement 70 is shown, so that the lifting hook 13 can seize the corresponding rail 5 in a sleeper crib 22 at the rail base. The gripping position is shown by means of a pictogram. At this track location 33, only three rollers of the lifting unit 9 can be brought into a gripping position.

Since there are no obstacles 37-42 in the region of the sleeper 17 to be tamped, all tamping tines 20 can be employed. In this, the operating positions of the individual tamping tines 20 are represented by schematic cross-sections of the tines 20. The position of the suspension device 18 is characterized by a solid line, wherein an adaptation to an oblique position of the sleeper 17 takes place by a rotation about the vertical axis 19.

In a third display window 71, information regarding the operating position of the suspension device 18 as well as the lateral displacements and angular positions of the respective tamping tines 20 is shown. In this, each tamping tine 20 is represented schematically in the determined operating position with respect to a respective rail cross-section in order to enable a quick evaluation of the situation. Also, the determined opening width of the opposing tamping tines 20 and thus the operating position of the limit flaps can be shown here or in another work window 65, 66. With a combined confirmation query in the second display window 66, an approval or rejection of the operating positions of all working units 9, 10, 11 can take place.

In FIG. 9, the image of the switch 2 is rotated by 180°. The viewing direction of the operator thus corresponds to the working direction 26, as is customary with line tamping machines. This representation is suited for monitoring the determined operating positions of the tamping units 11. During line tamping, the track lifting can be carried out in a totally automatized way since only roller lifting tongs are used and obstacles are very rare. These are detected in any case by the sensor device 27 so that a collision can be safely avoided.

Here, the basis is a method procedure according to FIG. 6. For each track location 33 with already determined operating positions of the working units 9, 10, 11, additional information is shown in a respective second display window 66. In the third display window 71, the most recently determined lateral- and angular positions of the tamping tines 20 are shown. As soon as the respective track location 33 has reached the display horizon 59, the corresponding operating position representations including additional information vanish in the display windows 65, 66, 71. A readjustment 64, if necessary, takes place prior to release of the working operation 21.

Other display variants are also suited to enable the operator 36 to release determined operating positions. This includes purely textual or purely graphical information about the operating positions or a three-dimensional representation by means of suitable monitors or data goggles.

The invention claimed is:

1. A method of controlling a track maintenance machine, comprising a switch tamping- or universal tamping machine, which moves along a track and has working units, comprising a tamping unit and a lifting unit, which are adjustable relative to a machine frame, wherein the method comprises the following steps:
   recording position data of track objects, comprising sleepers, rails and obstacles, by means of a sensor device in front of the working units in a working direction, and
   determining operating positions of the working units for a working operation at a track location,
   displaying-the determined operating positions of the working units by means of a display device prior to actuation of the working units; and
   changing the operating positions of the working units by an operator by means of control elements prior to carrying out the working operation.

2. The method according to claim 1, wherein a virtual representation of the track is shown in the display device, and that the determined operating positions of the working units are displayed with respect to said representation.

3. The method according to claim 1, wherein a photographic representation of the track is displayed in the display device.

4. The method according to claim 1, wherein the sleepers, the rails and, identified obstacles are marked as distinguishable objects in the display device.

5. The method according to claim 1, wherein a display horizon moving along with the track maintenance machine is specified which is located ahead of a current position of the working units in the working direction, and that the determined operating positions of the working units are displayed until the display horizon has been reached.

6. The method according to claim 5, wherein, until the display horizon is reached, a query for confirmation of the determined operating positions of the working units is displayed and that in the event of reaching the display horizon without confirmation of the query, the track maintenance machine is stopped.

7. The method according to claim 6, wherein, in the event of approval of the determined operating positions and when the track location is approached, the working units are brought into the operating positions by means of automatically actuated drives, and that the working operation is carried out.

8. The method according to claim 6, wherein, in the event of rejection of the determined operating position of a working unit and reaching the track position, the working unit is stopped, and that the working unit is brought into the operating position by means of drives actuated via the control elements.

9. The method according to claim 1, wherein, when approaching the track position, the working units are brought into the determined operating positions by means of automatically actuated drives, that the operating positions can be readjusted via the control elements, and that the working operation is carried out after actuation of a release control element.

10. The method according to claim 1, wherein the determined operating position of a lifting hook of the lifting unit is displayed together with information about a detected gripping position at a rail base or at a rail head.

11. The method according to claim 1, wherein the determined operating position of an extendable auxiliary lifting unit is displayed with information about an extension- or retraction procedure.

12. The track maintenance machine comprising:
   a machine frame
   working units which are adjustable and arranged on the machine frame,
   sensor- and control system for automatized actuation of the working units, wherein the sensor- and control system comprises;
   a display device; and
   control elements, wherein the sensor- and control system is configured for carrying out a method according to claim 1 with the display device displaying the determined operating positions of the working units prior to actuation of the working units and with the control elements for changing the operating position of the working units by the operator prior to carrying out the working operation.

13. The track maintenance machine according to claim 12, wherein the sensor- and control system comprises a sensor device having several differently constructed sensors.

14. The track maintenance machine according to claim 12, wherein the sensor- and control system comprises a so-called guiding computer for correction of a track position, a machine control for actuation of the working units and a computer unit for determining the operating positions of the working units, and that the guiding computer, the machine control and the computer unit are connected via a bus system.

15. The track maintenance machine according to claim 12, wherein the display device and the control elements are arranged in a driver's cabin, and that a camera for transmission of real-time images of the working units into the driver's cabin is arranged for an adjustment of the working units by means of the control elements.

* * * * *